(12) United States Patent  
Ziminsky et al.

(10) Patent No.: US 7,441,398 B2
(45) Date of Patent: Oct. 28, 2008

(54) NOX ADJUSTMENT SYSTEM FOR GAS TURBINE COMBUSTORS

(75) Inventors: Willy Steve Ziminsky, Simpsonville, SC (US); Scott Kopcho, Atlanta, GA (US); Mark P. Bombard, Amsterdam, NY (US); Anthony Joseph Antonucci, Kent, OH (US)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 10/908,643

(22) Filed: May 20, 2005

(65) Prior Publication Data

US 2006/0260319 A1 Nov. 23, 2006

(51) Int. Cl.
*F02C 9/26* (2006.01)
(52) U.S. Cl. ........................ 60/39.281; 60/746
(58) Field of Classification Search .............. 60/39.281, 60/742, 746, 747
See application file for complete search history.

(56) References Cited

U.S. PATENT DOCUMENTS

| | | | | |
|---|---|---|---|---|
| 5,024,055 A | * | 6/1991 | Sato et al. | 60/39.281 |
| 5,878,566 A | * | 3/1999 | Endo et al. | 60/39.281 |
| 6,092,362 A | * | 7/2000 | Nagafuchi et al. | 60/39.281 |

* cited by examiner

*Primary Examiner*—Louis J Casaregola
(74) *Attorney, Agent, or Firm*—Cantor Colburn LLP

(57) ABSTRACT

An embodiment may comprise a system for controlling NOx emissions from a turbine having combustion chambers. The system may comprise a center fuel flow and a plurality of outer fuel flows for each of a plurality of combustion chambers. An outer fuel flow is set to achieve a desired level of combustion dynamics for at least one of the plurality of combustion chambers. A delta adjustment value is determined for the center fuel flow that will result in a desired level of NOx emissions from the turbine, and for adjusting the center fuel flow according to the determined delta adjustment value to obtain the desired level of NOx emissions from the turbine.

13 Claims, 4 Drawing Sheets

Exemplary Multiple Combustion Chamber Fuel Supply System

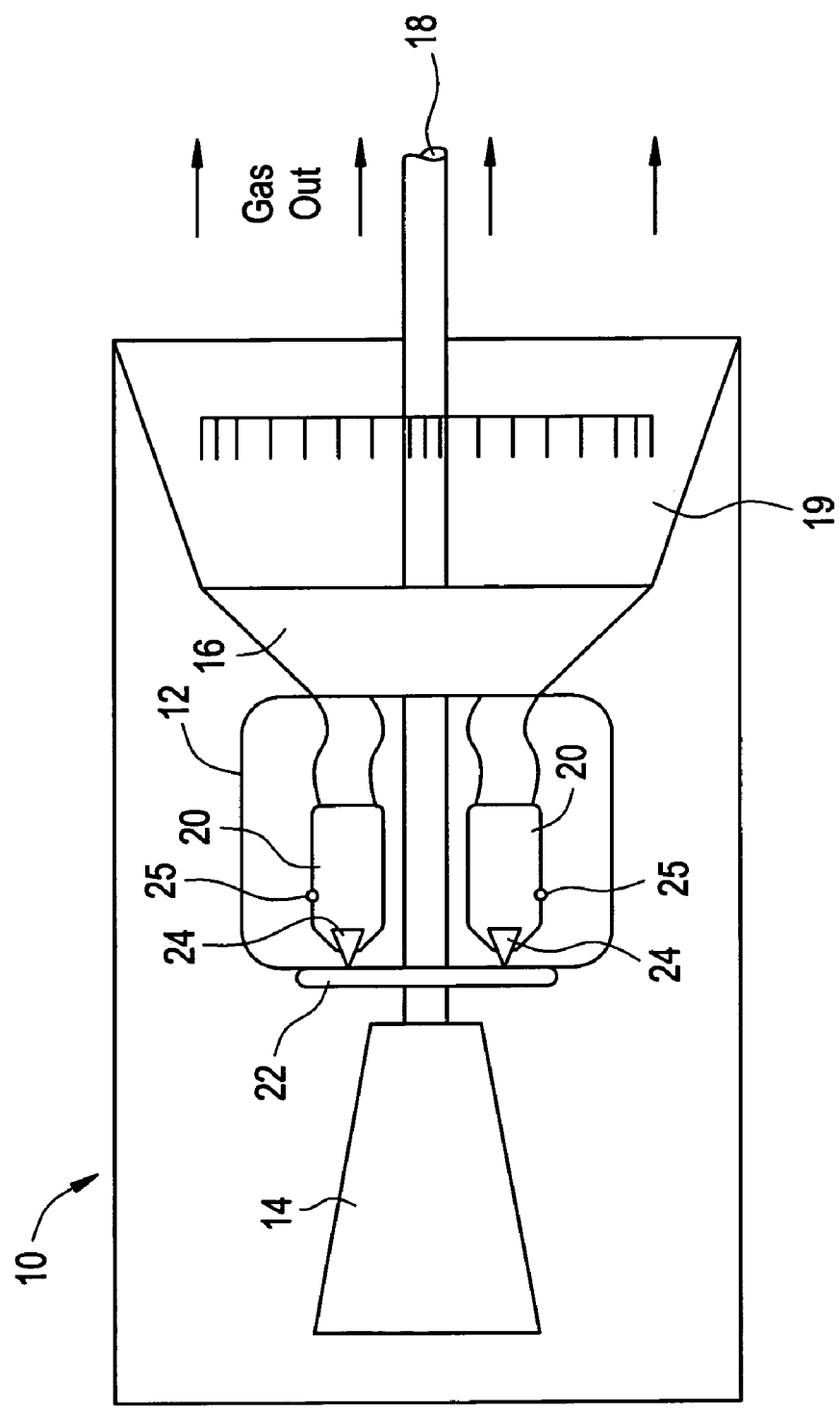
FIG. 1
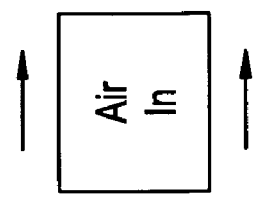

Exemplary Multiple Combustion Chamber Fuel Supply System

FIG. 4

| Inputs | | |
|---|---|---|
| NOx | 7 | ←-- Current NOx |
| NOx Ref | 8 | ←-- NOx you want to achieve |
| PM1o | 17 | ←-- Current PM1 Split (Absolute) |
| PM3o | 64 | ←-- Current PM3 Split (Absolute) |

| Outputs | relative | absolute | |
|---|---|---|---|
| dPM1 | 0.45 | 17.45 | ←-- New PM1 to achieve NOX |
| dPM3 | 0.35 | 64.35 | ←-- New PM3 to achieve NOX |

| DATA pt | TSN | Initial NOx | Target NOx | Resultant NOX | Initial PM1 | Initial PM3 | Resultant PM1 | Resultant PM3 | Quat |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |

NOX ADJUSTMENT SYSTEM FOR GAS TURBINE COMBUSTORS

BACKGROUND OF THE INVENTION

Current practice for NOx tuning of gas combustor turbines, used in power plants for example, is to make incremental adjustments until a target NOx emissions level is achieved. This process can be time consuming and requires a technician to interrupt the normal operation of the gas turbine.

Gas turbines, typically have multiple combustion chambers. The combustion chambers are termed "cans" in the art. The can to can variation in terms of fuel to air ratio leads to some cans being hotter, i.e. higher flame (or firing) temperature than others due to higher fuel to air ratio than other cans. These cans exhibit higher Nitrogen Oxides (NOx) emissions and certain pressure dynamic spectral tones corresponding to higher flame temperature tend to be stronger. On the other hand, this variation can lead to one can burning very lean or almost "blowing out" (i.e., flame extinguishes), if for example, the fuel to air ratio is below a certain threshold. The blowout of a combustion chamber or a can is termed "Lean Blow out" or LBO. Colder cans have higher LBO risk and higher Carbon Monoxide (CO) emissions due to leaner fuel to air ratio than hotter cans that have higher NOx emissions due to higher fuel to air ratio. Colder cans also have certain dynamic tones that respond to colder firing temperature, i.e., tones that increase in amplitude as firing temperature decreases Using pressure vibration sensors, feedback for each can, fuel flow and airflow is scheduled at the global or turbine level (total air and fuel for all the cans) to meet turbine load requirements such that the combustion dynamics in each can and emissions at the turbine level are within acceptable limits. Specifically, according to current combustion tuning practice, the overall fuel splits from the fuel system to the cans and the bulk fuel flow are set through the main fuel gas control valves.

However, an efficient method for tuning the f/a ratio in relation to NOx emissions is needed to ensure uniform life of the cans and to provide more efficient operation of the turbine and reduced emissions.

Thus, for example, in regard to NOx emissions a system that enables adjustment of the fuel to air ratio of individual fuel valves in order to meet defined NOx emission targets is needed.

BRIEF DESCRIPTION OF THE INVENTION

An embodiment may comprise a method or a system for controlling NOx emissions from a gas turbine having a fuel adjustment system that may comprise setting an outer nozzle fuel flow to achieve a desired level of combustion dynamics for at least one of a plurality of combustion chambers; determining a delta adjustment value for a center nozzle fuel flow that will result in a desired level of NOx emissions from the gas turbine; and adjusting the center nozzle fuel flow according to the determined delta adjustment value to obtain the desired level of NOx emissions from the gas turbine.

An embodiment may also comprise a fuel adjustment system for controlling NOx emissions from a gas turbine having combustion chambers comprising: a center fuel nozzle and a plurality of outer fuel nozzles for each of a plurality of combustion chambers and a controller. The controller may perform: setting an outer nozzle fuel flow to achieve a desired level of combustion dynamics for at least one of the plurality of combustion chambers; and determining a delta adjustment value for a center nozzle fuel flow that will result in a desired level of NOx emissions from the gas turbine; at least one first flow control device performing: adjusting the center nozzle fuel flow according to the determined delta adjustment value to obtain the desired level of NOx emissions from the gas turbine; and at least one second flow control device performing: setting the outer nozzle fuel flow.

An embodiment may also comprise a system for controlling NOx emissions from a turbine having combustion chambers comprising: a center fuel flow means and a plurality of outer fuel flow means for each of a plurality of combustion chambers; means for setting an outer fuel flow means to achieve a desired level of combustion dynamics for at least one of the plurality of combustion chambers; means for determining a delta adjustment value for the center fuel flow means that will result in a desired level of NOx emissions from the turbine, and for adjusting the center fuel flow means according to the determined delta adjustment value to obtain the desired level of NOx emissions from the turbine.

BRIEF DESCRIPTION OF THE DRAWINGS

The following descriptions of various exemplary embodiments are not intended to be, and should not be considered to be, limiting in any way.

FIG. 1 is a diagram of a gas turbine having combustion cans.

FIG. 4 is a data chart showing NOx input and output levels.

DETAILED DESCRIPTION OF THE INVENTION

Figure 2:
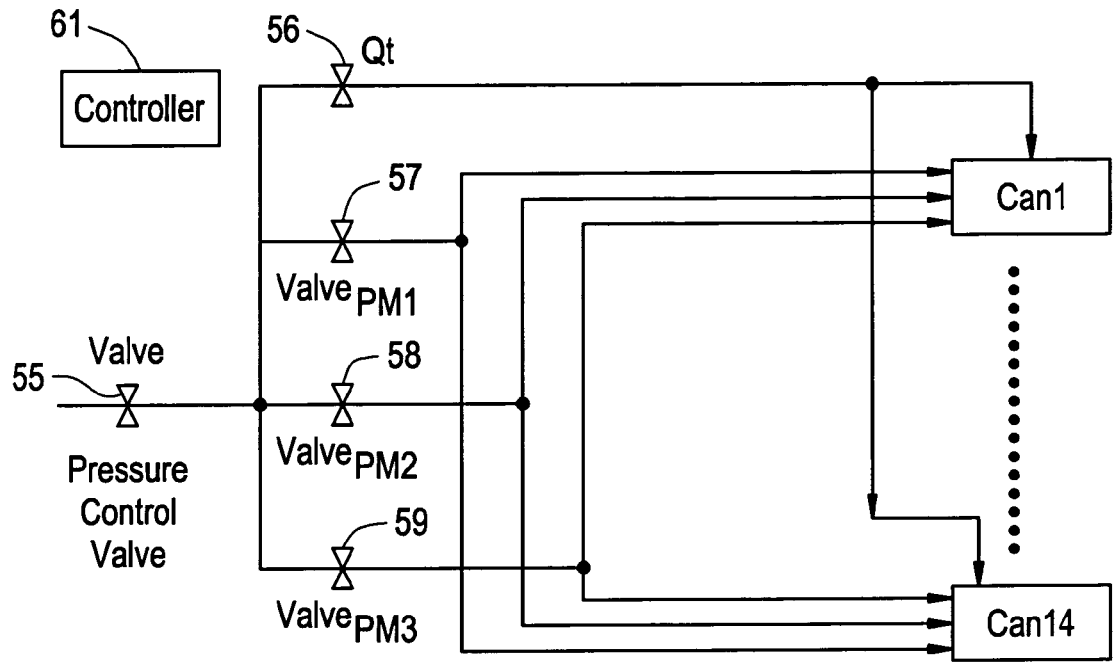
FIG. 2 is schematic diagram of a typical combustor fuel system showing PM1 and PM3 fuel valves for example.

An example of a gas turbine is shown in FIG. 1. However, the present invention may be used with many different types of turbines, and thus the turbine shown in FIG. 1 should not be considered limiting to this disclosure.

As shown in FIG. 1, a gas turbine 10 may have a combustion section 12 located in a gas flow path between a compressor 14 and a turbine 16. The combustion section 12 may include an annular array of combustion chambers known herein as combustion cans 20. The turbine 10 is coupled to rotationally drive the compressor 14 and a power output drive shaft 18. Air enters the gas turbine 10 and passes through the compressor 14. High pressure air from the compressor 14 enters the combustion section 12 where it is mixed with fuel and burned. High energy combustion gases exit the combustion section 12 to power the turbine 10, which, in turn, drives the compressor and the output power shaft 18. The combustion gases exit the turbine 16 through the exhaust duct 19, which may include a heat recapture section to apply exhaust heat to preheat the inlet air to the compressor.

Fuel is injected via the nozzles 24 into each chamber and mixes with compressed air flowing from the compressor. A combustion reaction of compressed air and fuel occurs in each chamber. A more detailed description of one example of a fuel system is described in below in reference to FIG. 2; however other fuel systems are possible.

In FIG. 2 it can be seen that a main fuel valve 55 is located upstream of four other valves. The four fuel to air ratio valves is this example are the Quat (Qt) valve 56, Premix 1 valve (PM1) 57, Premix 2 valve (PM2) 58, and Premix 3 valve (PM3) 59; however other arrangements are also envisioned. In this example, a turbine having fourteen combustor cans is shown, but any number of combustor cans may be used depending upon the application.

Figure 3:
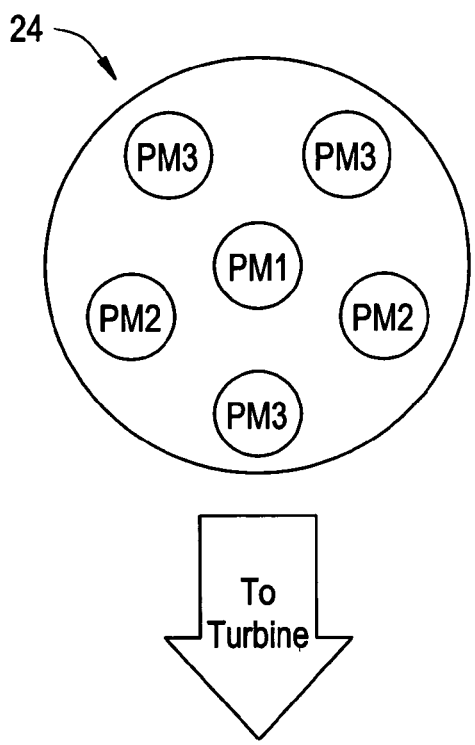
FIG. 3 is front view of an example of a fuel nozzle assembly showing PM1, PM2, PM3, fuel nozzles.

FIG. 3 shows the radial arrangement of the nozzles 24 in an exemplary embodiment. In FIG. 3, there are three Premix 3 nozzles each labeled PM3. Likewise, there are two Premix 2 nozzles each labeled PM2. In the center, there is one premix 1 center nozzle (PM1). It is noted that although a PM1 arrangement is used for purposes of example, this invention may be used with any center nozzle arrangement other arrangements.

Figure 5:
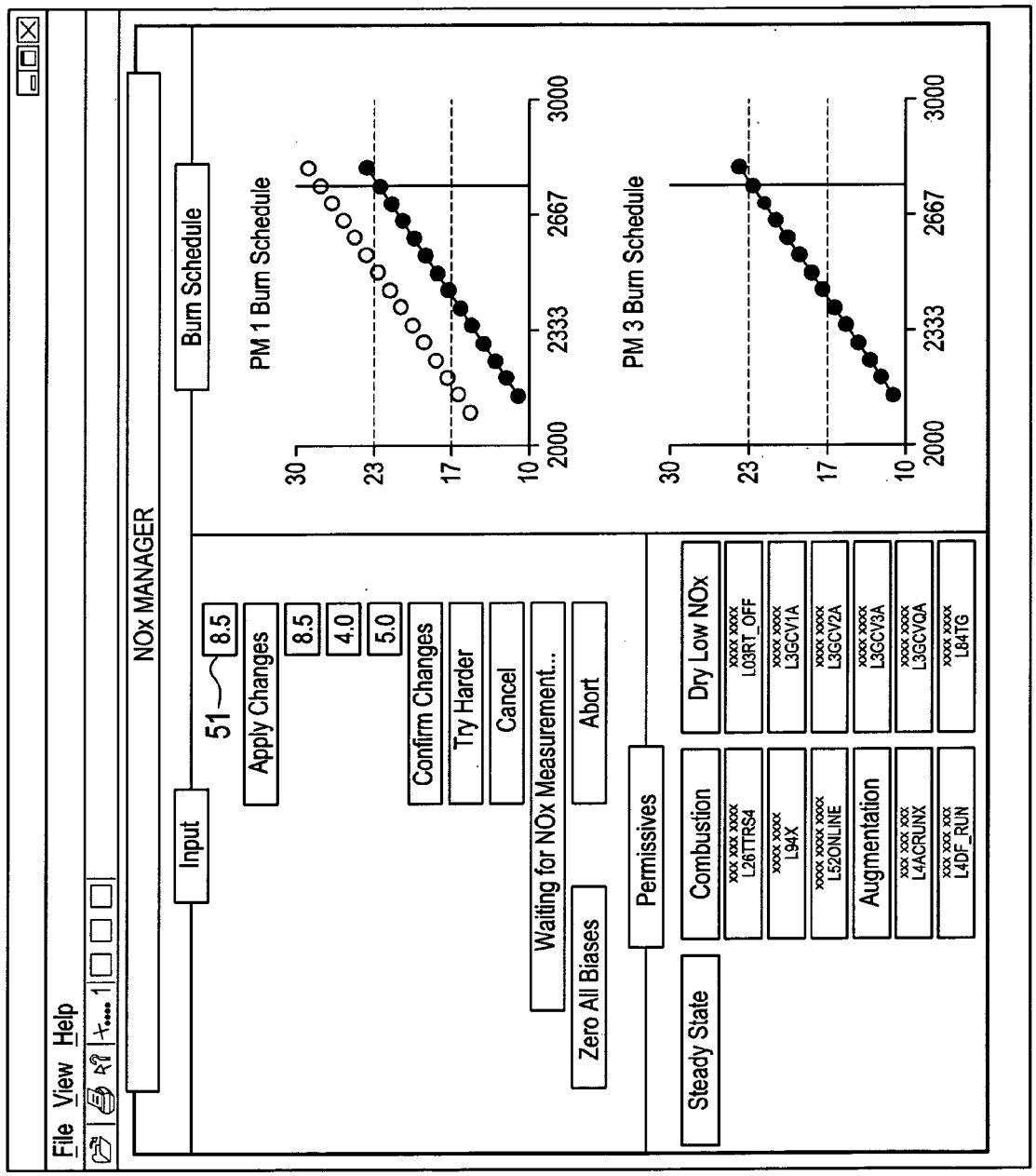
FIG. 5 is a screen shot of an example of a user interface.

A direct method for changing NOx emissions based on targets or user set NOx emissions values did not previously exist. With the present method one will be able to adjust directly from one NOx emissions level to another using a transfer function that may be directly programmed into a turbine controller 61, for example or sent from a remote location control. See for example FIG. 4 wherein a current PM1 fuel split setting is shown at level 17 to result in a NOx output of 7. However, in FIG. 4, the user desires to have the NOx output be at level 8. Thus, in this example, the present method computes and/or determines a new PM1 setting of 17.45 to achieve the desired NOx output of level 8 as shown. FIG. 5 is an example of a computer software interface that allows the user to enter the actual NOx that is sensed, and the system will adjust to a pre defined NOx target.

Specifically, an exemplary embodiment of the present method and system is described below in regard to a center nozzle gas turbine combustion systems such as, but not limited to, the one shown in FIG. 3 for example. Using a closed loop, the combustion system or gas turbine fuel splits will be manipulated so as to match the actual emissions level of the gas turbine to a reference level. This reference level may be determined either by a transfer function or a direct reference level entered by a user. One skilled in the art can use many suitable transfer functions to achieve this result. This methodology will allow for NOx emissions changes that would be considered inside the normal acceptable adjustment range that is taken under consideration today by manual processes, and may be approximately +50% to −30% from design target, for example. This method may also be programmed into gas turbine controllers 61 for the purpose of offering a self-tuning (automatic adjustment to bounded reference) NOx emission control system, for example.

The method may be based on several combustor dynamics characteristics. For example, in one embodiment, the controller logic controls a logic hierarchy of fuel flow so the entry fuel flow times the PM1 valve 57 setting leaves a remainder amount of fuel. That remainder amount of fuel is split between the PM2 58 and PM3 59 valves (Quat (Qt) valve 56 may or may not also be used). Therefore, adjustments to the PM1 fuel split upstream automatically affect the PM3 fuel flow automatically because it is downstream in the hierarchy logic. Test data has shown that it is efficient to set the PM3 59 valve to achieve a desired combustor combustion dynamic. For example, to achieve a setting where Lean Blow Out (LBO) does not occur, it is efficient to adjust the PM3 valve to achieve the desired combustor dynamic or operating state. For example, a state where a dynamic tone is present that indicates the desired operating state. Also, for example, Watts output may be regarded as an operating state. Then, once the PM3 valve 59 is set, in the present method, a suitable transfer function (not shown) is used to manipulate the PM1 57 valve setting to achieve a desired NOx emissions level. Thus, in this embodiment the PM1 valve 57 setting is changed while the PM3 valve 59 setting is held constant.

Benefits of the present method and system include but are not limited to decreasing time for a compliance cycle by automating the NOx emissions tuning process and maximizing the distance from LBO while maintaining acceptable emissions.

One of ordinary skill in the art can appreciate that a computer or other client or server device can be deployed as part of a computer network, or in a distributed computing environment. In this regard, the methods, systems, and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein is operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different power plants or different power generator units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above.

Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus of described above and/or claimed herein. Further, any storage techniques used in connection with the methods and apparatus described above and/or claimed herein may invariably be a combination of hardware and software. The technical effect of the executable code is to facilitate the present methods of NOx emissions control from a turbine.

While the methods and apparatus described above and/or claimed herein have been described in connection with the preferred embodiments and the figures, it is to be understood that other similar embodiments may be used or modifications and additions may be made to the described embodiment for performing the same function of the methods and apparatus described above and/or claimed herein without deviating therefrom. Furthermore, it should be emphasized that a variety of computer platforms, including handheld device operating systems and other application specific operating systems are contemplated, especially given the number of wireless networked devices in use.

While the invention is described with reference to the above embodiments, it is contemplated that the benefits of the invention accrue to alternative types and configurations. Consequently, the description set forth above is for illustrative purposes only, and is not intended to restrict or limit the invention to any particular embodiment.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A fuel adjustment system for controlling NOx emissions from a gas turbine having combustion chambers comprising:
   a center fuel nozzle and a plurality of outer fuel nozzles for each of a plurality of combustion chambers;
   a controller structured to:
      set an outer nozzle fuel flow to achieve a desired level of combustion dynamics for at least one of the plurality of combustion chambers; and
      determine an adjustment value for a center nozzle fuel flow that will result in a desired level of NOx emissions from the gas turbine;
   at least one first flow control device structured to adjust the center nozzle fuel flow according to the determined adjustment value to obtain the desired level of NOx emissions from the gas turbine; and
   at least one second flow control device structured to set the outer nozzles fuel flow.

2. The system of claim 1 wherein the at least one first flow control device is a premix valve.

3. The system of claim 1 wherein the at least one second flow control device is a premix valve.

4. The system of claim 1 wherein the at least one first flow control device is structured to adjust the center nozzle fuel flow while an outer nozzle fuel flows setting is held constant.

5. The system of claim 1 wherein the controller is structured to determine the adjustment value for the center nozzle fuel flow that will result in a desired level of NOx emissions from the gas turbine by using a transfer function for determining the adjustment value for the center nozzle fuel flow to directly adjust the gas turbine from a first NOx emissions level to a second NOx emissions level.

6. The system of claim 5 wherein the transfer function is programmed into a turbine controller.

7. The system of claim 5 wherein a result of the transfer function is determined at a remote location and transferred to a local turbine control.

8. The system of claim 1 wherein the controller is structured to set the outer nozzle fuel flow to achieve the desired level of combustion dynamics for the at least one of a plurality of combustion chambers according to an operating state of the turbine.

9. The system of claim 8 wherein the operating state of the turbine is indicated by dynamic tones or watts output.

10. A system for controlling NOx emissions from a turbine having combustion chambers comprising:
    a center fuel flow means and a plurality of outer fuel flow means for each of a plurality of combustion chambers;
    means for setting an outer fuel flow means to achieve a desired level of combustion dynamics for at least one of the plurality of combustion chambers;
    means for determining an adjustment value for the center fuel flow means that will result in a desired level of NOx emissions from the turbine, and for adjusting the center fuel flow means according to the determined adjustment value to obtain the desired level of NOx emissions from the turbine.

11. The system of claim 10 wherein the adjusting the center fuel flow means is performed while an outer fuel flow means setting is held constant.

12. The system of claim 10 wherein the means for determining the adjustment value for the center fuel flow means that will result in a desired level of NOx emissions from the turbine further comprises:

means for using a transfer function for determining the adjustment value for the center fuel flow means to directly adjust the turbine from a first NOx emissions level to a second NOx emissions level.

13. The system of claim 10 wherein the means for setting the outer fuel flow means to achieve the desired level of combustion dynamics for the at least one of a plurality of combustion chambers is structured to perform according to an operating state of the turbine.

* * * * *